United States Patent [19]

Grainge

[11] Patent Number: 5,277,460
[45] Date of Patent: Jan. 11, 1994

[54] SPLIT SECTION BODY JOINT WITH WEDGE RING

[75] Inventor: Richard W. Grainge, Stevenage, England

[73] Assignee: British Aerospace Public Limited Company, London, England

[21] Appl. No.: 956,985

[22] Filed: Oct. 6, 1992

[30] Foreign Application Priority Data

Oct. 12, 1991 [GB] United Kingdom ................. 9121681

[51] Int. Cl.⁵ .............................................. F16L 21/06
[52] U.S. Cl. ........................................ 285/421; 285/309; 285/389; 285/314; 403/341
[58] Field of Search ............... 285/421, 419, 321, 309, 285/389, 327, 249, 314, 315; 403/341, 409.1, 367, 368, 370, 374, 380

[56] References Cited

U.S. PATENT DOCUMENTS

| | | | |
|---|---|---|---|
| 309,444 | 12/1884 | Dunning | 285/327 |
| 1,691,255 | 11/1928 | Selah | 285/389 |
| 2,544,712 | 3/1951 | Miller | 285/249 |
| 3,706,281 | 12/1972 | Hatakeyama . | |
| 4,127,290 | 11/1978 | Mutschlechner | 285/421 |
| 4,159,132 | 6/1979 | Hitz | 285/421 |
| 4,209,193 | 6/1980 | Ahlstone | 285/309 |
| 4,485,740 | 12/1984 | Boss . | |
| 4,496,172 | 1/1985 | Walker | 285/419 |
| 4,547,003 | 10/1985 | McGugan | 285/419 |
| 4,557,508 | 12/1985 | Walker | 285/321 |
| 4,684,156 | 8/1987 | Rhodes | 285/421 |
| 4,699,062 | 10/1987 | Lewis et al. . | |

*Primary Examiner*—Eric K. Nicholson
*Attorney, Agent, or Firm*—Cushman, Darby & Cushman

[57] ABSTRACT

A device and method of manufacturing a jointing together cylindrical bodies, in which one of the bodies is composed of two semi-cylindrical shells. Each body is provided with a flanged end which are locked against one another by a threaded clamping ring having a bevelled face 8. In an alternative embodiment, the clamping ring comprises a tapered circlip. The method is especially useful for the jointing together of the various cylindrical parts comprising a missile.

12 Claims, 3 Drawing Sheets

SPLIT SECTION BODY JOINT WITH WEDGE RING

BACKGROUND OF THE INVENTION

This invention relates to a tubular body having at least 3 parts joined together and a method for joining the same.

The invention is particularly useful for the joining cylindrical aerodynamic bodies, such as missiles for example. The missiles to which this invention is applicable are usually constructed by fitting two mating semi-cylindrical shells with necessary electronic control equipment and then clamping the mated shells onto a cylindrical body tube. The body tube may incorporate a propulsion unit. Known jointing methods involve the use of a series of fasteners or a manacle ring. These known fastener types have the disadvantage of making a marked contribution to the aerodynamic drag of the missile because they are not flush with the missile body skin.

Objects of this invention ar to provide a clamping arrangement which does not incur aerodynamic drag, which eliminates the need for joint clearances and which provides good geometric alignment.

BRIEF SUMMARY OF THE INVENTION

According to a first aspect of this invention there is provided a jointing arrangement for a body in which the body is composed of three parts to be joined together, a first of the parts having the form of a cylinder, and a second and third of the parts being composed of two complementary portions of a longitudinally-split cylinder.

The arrangement comprises a flanged portion for attachment to an end of the first part, two bevelled flanged portions, each for attachment to an end of each of the second and third parts, and a clamping ring, having a bevelled face, for holding the flanged portion against the bevelled flanged portions.

According to a second aspect of the invention there is provided a method for jointing a body in which the body is composed of three parts to be joined together; a first of the parts having the form of a cylinder, and a second and third of the parts being composed of two complementary portions of a longitudinally-split cylinder.

The method comprises the steps of providing the first part with a flanged portion at one of its ends;

placing a clamping ring having a bevelled face over the first part and clear of the flanged portion;

providing the second and third parts with bevelled flanged portions at one of their ends;

offering up the first, second and third parts to one another so that the flanged portion interleaves with the bevelled flanged portions; and relocating the clamping ring so that its bevelled face abuts the bevelled flanged portions of the second and third parts.

Using this arrangement, the clamping ring can be made flush with the outer skin of the three parts. Thus, no aerodynamic drag is incurred.

The bevelling of the ring and flanged portion of the second and third parts allows a component of the clamping forces exerted by the ring to be directed radially, i.e. inwards, towards the common longitudinal axis of the three parts, thus providing a rigid joint with good geometric alignment.

The arrangement also eliminates the need for joint clearances because all tolerances in the jointed parts are eliminated by tightening the clamping ring.

The arrangement has the further advantages of being uncomplicated and comprising very few parts.

In one embodiment, the clamping ring is threaded and mates with a corresponding thread which is provided on the outer surface of the first part.

In an alternative embodiment the clamping ring comprises a circlip.

Preferably the interleaving flanges are secured together by dowels and/or adhesive before the clamping ring is tightened up against the bevelled flanges.

BRIEF DESCRIPTION OF THE DRAWINGS

Embodiments of the invention will now be described by way of example only with reference to the drawings of which.

DETAILED DESCRIPTION OF THE PREFERRED EMBODIMENTS

Figure 1:
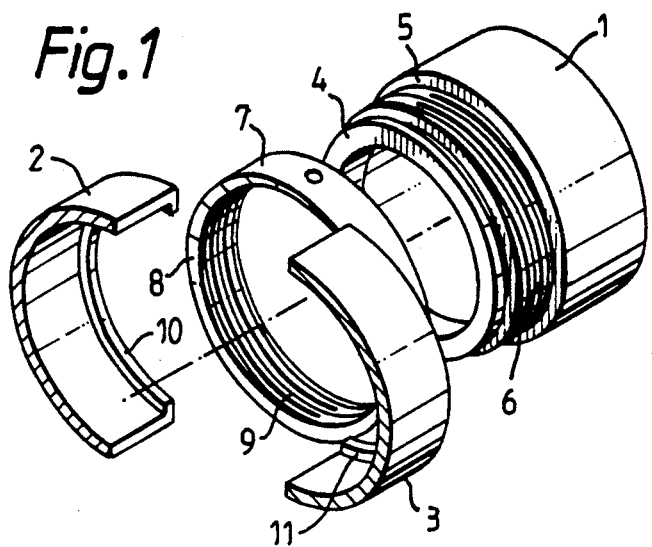
FIG. 1 is a perspective, exploded view of a joint in accordance with the invention.
Figure 2:
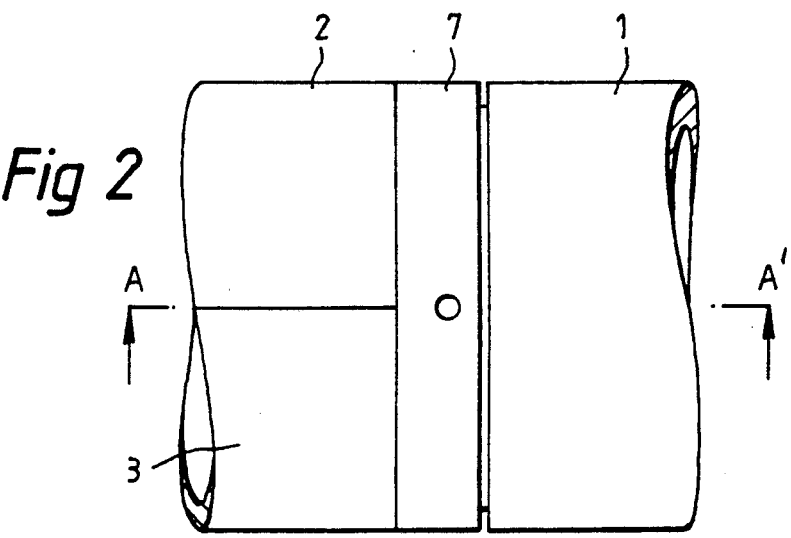
FIG. 2 is a side view of the joint of FIG. 1.
Figure 3:
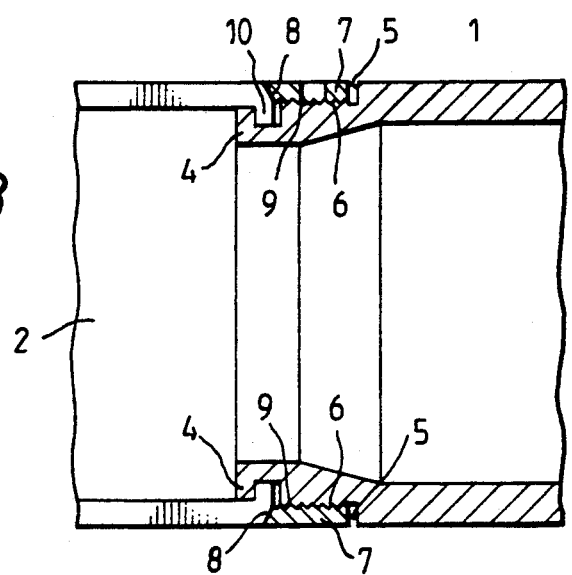
FIG. 3 is a cross-sectional view along the line A—A' in FIG. 2.

A first embodiment will be described with reference to FIGS. 1, 2 and 3. The components to be joined together are a cylindrical body 1 and two split semi-cylindrical sections 2 and 3. These three components comprise part of a missile. The body 1 incorporates a flanged portion 4 at one of its ends a stepped portion 5 and an exterior screw thread 6 between flange 4 and stepped portion 5. A clamping ring 7 has a bevelled face 8 and its interior surface 9 is threaded. Each split semi-cylindrical section 2, 3 has a bevelled flanged end portion 10 and 11 respectively.

In order to assemble the joint, the clamping ring 7 is threaded onto the cylindrical body 1 until it abuts the stepped portion 5. Then the two split sections 2 and 3 are arranged with the body 1 so that the flanged ends 10 and 11 interleave with the flanged portion 4. (See FIG. 3). The interleaving flanges 10, 11 and 4 are secured together with an adhesive. Next, using a C-spanner the clamping ring 7 is tightened in a direction away from the stepped portion 5 and towards the flanges 10 and 11 until the bevelled face 8 of the ring 7 has clamped both bevelled flanges 10 and 11 against the flanged portion 4. The clamping ring thus provides lateral and axial compressive forces throughout the mating components 1, 2 and 3.

Figure 4:
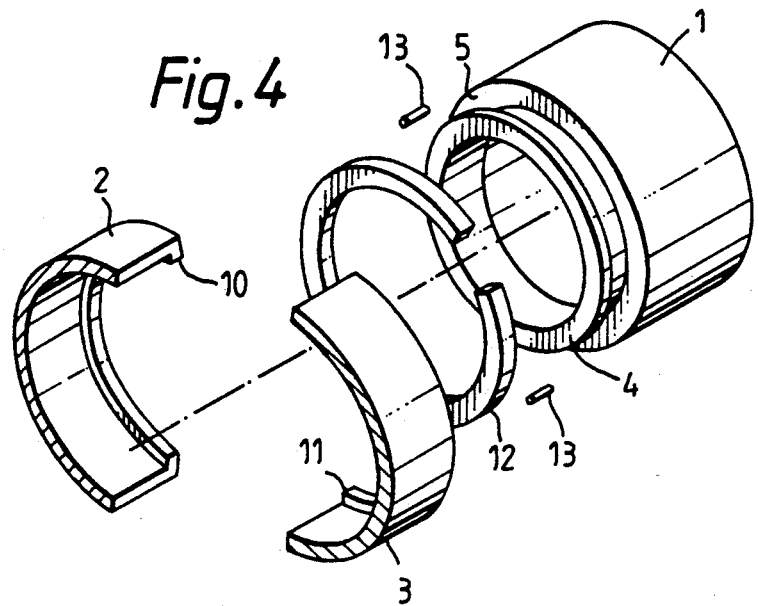
FIG. 4 is a perspective, exploded view of an alternative form of joint in accordance with the invention.
Figure 5:
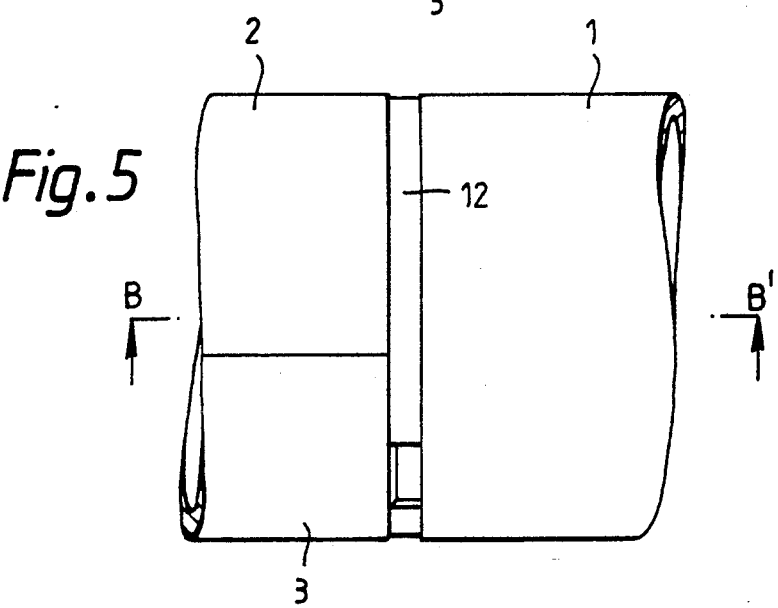
FIG. 5 is a side view of the joint of FIG. 4.
Figure 6:
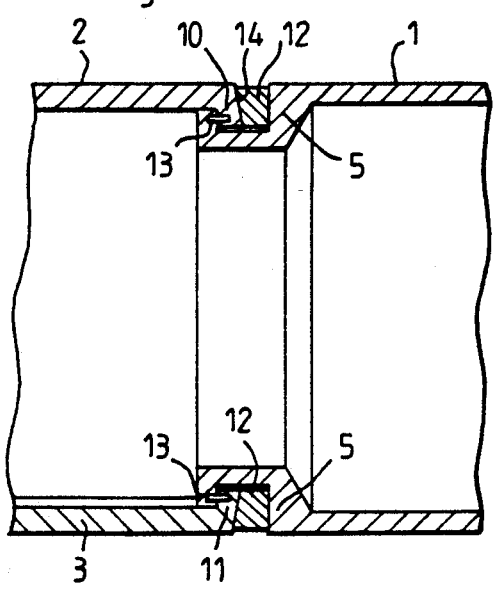
FIG. 6 is a cross-sectional view along the line B—B' of FIG. 5.

A second alternative embodiment will now be described with reference to FIGS. 4, 5 and 6. Components which are common to the first embodiment described with reference to FIGS. 1, 2 and 3 have been given the same reference numerals. The essential difference between the two methods is that in the second method, a tapered circlip 12 is employed in place of a threaded clamping ring.

Thus, to assemble the components 1, 2 and 3 the circlip 12 is offered past the flanged portion 4 and the stepped portion 5 onto the full calibre of the cylindrical body 1. Then the two split sections 2 and 3 are mated to the body portion 1 as before and secured with dowels 13. Next, the circlip 12 is pulled back until it springs into the space between the flanges 10 and 11 and the stepped portion 5. The taper 14 on the circlip 12 abuts the bevelled part of the flanges 10 and 11 thus providing lateral and axial forces throughout the mating components.

Figure 7:
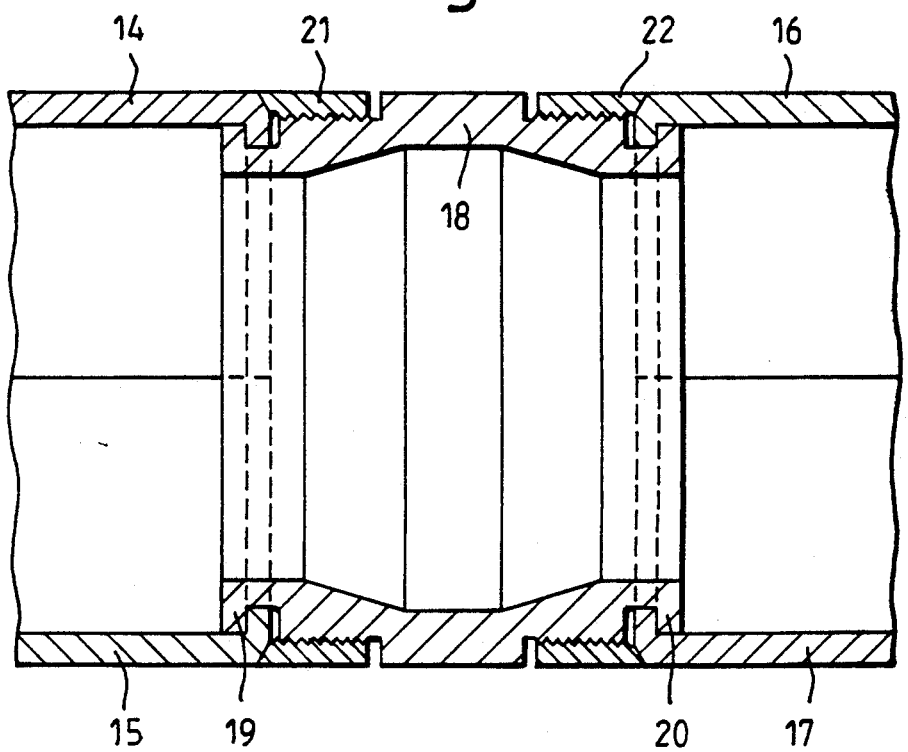
FIG. 7 is a sectional view of a third type of joint in accordance with the invention.

FIG. 7 shows how the method in accordance with the invention can be used to join body sections consisting of two split sections 14, 15, 16 and 17. Here an externally threaded central portion 18 has flanges 19, 20 at each of its ends which interleave with the bevelled flanged ends of the split sections 14, 15, 16 and 17. Two internally threaded clamping rings 21 and 22 with bevelled faces clamp the assembly together.

I claim:

1. A tubular assembly comprising:
    at least three separate parts joined together by a clamping ring, a first of said at least three separate parts being in the form of a cylinder, second and third of said at least three separate parts each comprising a respective section of a longitudinally-split cylinder,
    said first part having a first flanged portion at one end thereof,
    said second and third parts having second flanged portions and beveled portions at one end thereof, said second and third parts having said second flanged portions thereof cooperable with said first flanged portion so that said first, second and third parts form a tubular body, and
    said clamping ring having a beveled face cooperable with said beveled portions of said second and third parts to secure said second flanged portions to said first flanged portion so that said first, second and third parts cooperate to form said tubular body.

2. The tubular assembly as claimed in claim 1 wherein said first part comprises an external screw thread and said clamping ring comprises a corresponding internal screw thread, said clamping ring being screwed toward the second flanged portions so that the beveled face of said clamping ring is biased against the beveled portions of the second flanged portions.

3. The tubular assembly as claimed in claim 1 wherein said clamping ring comprises a circlip.

4. The tubular assembly as claimed in claim 1 wherein the tubular body comprises a smoothly contoured exterior surface.

5. The tubular assembly as claimed in claim 1 wherein the first part comprises a propulsion unit.

6. A tubular assembly comprising:
    at least three separate parts joined together by a clamping ring, a first of said at least three separate parts being in the form of a cylinder, second and third of said at least three separate parts each comprising a respective section of a longitudinally-split cylinder.
    said first part having a first flanged portion and an external screw thread at one end thereof,
    said second and third parts having second flanged portions cooperable with said first flanged portion so that said first, second and third parts form a tubular body, and
    said clamping ring having an internal screw thread corresponding to the external screw thread of said first part, said clamping ring being screwed to said first part and operatively securing said second flanged portions to said first flanged portion so that said first, second and third parts cooperate to form said tubular body.

7. The tubular assembly as claimed in claim 6 wherein
    said second and third parts each have beveled portions adjacent said second flanged portions,
    said clamping ring having a beveled face cooperable with said beveled portions of said second and third parts, and
    said clamping ring being screwed toward said second flanged portions so that the beveled face of said clamping ring is biased against the beveled portions of the second flanged portion.

8. The tubular assembly as claimed in claim 6 wherein the tubular body comprises a smoothly contoured exterior surface.

9. The tubular assembly as claimed in claim 6 wherein the first part comprises a propulsion unit.

10. A method for joining a tubular body comprising the steps of:
    providing a first part being in the form of a cylinder and having a first flanged portion at one end thereof,
    placing a clamping ring having a bevelled face over the first part and spaced from the first flanged portion,
    providing second and third parts each comprising a respective half of a longitudinally-split cylinder, said second and third parts each having second flanged portions with a beveled portion thereof,
    fitting said second flanged portions with said first flanged portion so that said first, second and third parts cooperate to form said tubular body, and
    moving said clamping ring toward said first flanged portion so that said beveled face of the clamping ring abuts the bevelled portions of said second flanged portions and so that said second flanged portions are clamped to the first flanged portion to form the tubular body.

11. The method as claimed in claim 10 wherein dowels are provided for securing the first flanged portion to the second flanged portions.

12. The method as claimed in claim 10 wherein the first flanged portion is secured to the second flanged portions with an adhesive.

* * * * *